(12) United States Patent
Roesch et al.

(10) Patent No.: US 12,544,864 B2
(45) Date of Patent: Feb. 10, 2026

(54) FITTING HOLDER

(71) Applicant: Georg Fischer Rohrleitungssysteme AG, Schaffhausen (CH)

(72) Inventors: Juergen Roesch, Lenzkirch (DE); Marcel Graf, Neuhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 90 days.

(21) Appl. No.: 18/596,948

(22) Filed: Mar. 6, 2024

(65) Prior Publication Data
US 2024/0300057 A1    Sep. 12, 2024

(30) Foreign Application Priority Data
Mar. 7, 2023    (EP) ..................... 23160344

(51) Int. Cl.
*B23K 37/00*    (2025.01)
*B23K 37/04*    (2006.01)
*B23K 37/0533*    (2025.01)

(52) U.S. Cl.
CPC ...... *B23K 37/0533* (2013.01); *B23K 37/0435* (2013.01)

(58) Field of Classification Search
CPC . F16L 47/02; F16L 47/03; F16L 21/04; F16L 41/06; F16L 41/12; F16L 37/008; F16L 41/02; F16L 47/30; B23K 2101/06; B23K 37/0435; B23K 37/0533
See application file for complete search history.

(56) References Cited

U.S. PATENT DOCUMENTS

| | | | | |
|---|---|---|---|---|
| 1,651,186 A | * | 11/1927 | Clark | ...... F16L 21/04 285/133.4 |
| 1,671,789 A | * | 5/1928 | Smith | ...... F16L 21/04 285/133.11 |
| 2,030,594 A | * | 2/1936 | Hyde | ...... B23K 37/053 269/305 |

(Continued)

FOREIGN PATENT DOCUMENTS

| | | |
|---|---|---|
| DE | 2119251 A1 | 11/1972 |
| GB | 1391075 A | 4/1975 |

(Continued)

*Primary Examiner* — Erin B Saad
(74) *Attorney, Agent, or Firm* — Harness, Dickey & Pierce, P.L.C.

(57) ABSTRACT

A fitting holder designed for receiving a branch pipe during a welding operation in order to attach the branch pipe to a pipeline or a pipe, wherein differently dimensioned branch pipes can be received by the fitting holder, comprising a hollow-cylindrical housing with an upper region which, during the welding, faces away from the pipeline to be welded thereto, and a lower region which, during the welding, faces the pipeline to be welded thereto, wherein mounts for the axial fixing of the branch pipe which can be received by the fitting holder are arranged in the lower region, a ring arranged displaceably in the housing, and clamping elements pressing the ring downwards, wherein the fitting holder has different guide inside diameters which guide the differently dimensioned branch pipes by way of their differently dimensioned outside diameters in the fitting holder.

12 Claims, 2 Drawing Sheets

(56) References Cited

U.S. PATENT DOCUMENTS

| | | | | |
|---|---|---|---|---|
| 3,918,748 | A * | 11/1975 | Acda | F16L 47/345 285/21.3 |
| 4,629,853 | A * | 12/1986 | Yttergren | B23K 9/032 219/60 A |
| 5,066,053 | A * | 11/1991 | Miller | F16L 21/065 285/379 |
| 5,310,982 | A * | 5/1994 | Jusionis | B23K 9/0286 219/60 R |
| 5,798,021 | A * | 8/1998 | Stiles | B25B 5/10 269/49 |
| 5,957,507 | A * | 9/1999 | Asada | F16L 41/14 285/289.1 |
| 6,089,615 | A * | 7/2000 | Jappinen | F16L 41/14 285/21.2 |
| 6,116,285 | A * | 9/2000 | Wilson | F16L 55/1108 138/92 |
| 6,142,165 | A * | 11/2000 | Wartel | F16L 41/06 29/559 |
| 2001/0010216 | A1* | 8/2001 | Usui | F02M 55/005 123/456 |
| 2002/0000719 | A1* | 1/2002 | Kunsman | F16L 41/12 285/197 |
| 2002/0011002 | A1* | 1/2002 | Bonny | F01N 13/1883 29/890.08 |
| 2004/0134592 | A1* | 7/2004 | Johnson | B29C 66/919 156/289 |
| 2004/0168727 | A1* | 9/2004 | Smahl | F16L 37/1225 285/125.1 |
| 2005/0005910 | A1* | 1/2005 | Usui | F02M 55/004 123/456 |
| 2005/0284447 | A1* | 12/2005 | Usui | F02M 55/02 123/468 |
| 2015/0377400 | A1* | 12/2015 | Rosenthal | F16L 41/12 285/194 |
| 2016/0305593 | A1* | 10/2016 | Kearns | F16K 27/062 |
| 2017/0284585 | A1* | 10/2017 | Hunnekuhl | F16L 47/30 |
| 2022/0040874 | A1* | 2/2022 | Spychalski-Merle | B23B 5/162 |
| 2023/0175624 | A1* | 6/2023 | Breyer | B29C 66/72523 |
| 2024/0300057 | A1* | 9/2024 | Roesch | F16L 47/28 |
| 2024/0424746 | A1* | 12/2024 | Bortoli | B29C 66/816 |

FOREIGN PATENT DOCUMENTS

| | | |
|---|---|---|
| JP | S57046859 A | 3/1982 |
| JP | S61010438 A | 1/1986 |

* cited by examiner

FITTING HOLDER

CROSS-REFERENCE TO RELATED APPLICATIONS

This application claims the benefit and priority of European Patent Application No. 23 160 344.0 filed Mar. 7, 2023. The entire disclosure of the above application is incorporated herein by reference.

BACKGROUND OF THE INVENTION

Technical Field

The invention relates to a fitting holder designed for receiving a branch pipe during a welding operation in order to attach the branch pipe to a pipeline or a pipe, wherein differently dimensioned branch pipes can be received by the fitting holder, comprising a hollow-cylindrical housing with an upper region which, during the welding, faces away from the pipeline to be welded thereto, and a lower region which, during the welding, faces the pipeline to be welded thereto, wherein mounts for the axial fixing of the branch pipe which can be received by the fitting holder are arranged in the lower region, a ring arranged displaceably in the housing, and clamping elements pressing the ring downwards.

Discussion

In order to attach branch pipes to pipelines or pipes, a bore is introduced into the existing plastics line, and the latter and also the branch pipe which can be attached to the pipeline are heated with a heating mirror. When the temperature is reached, the heating mirror is removed and the branch pipe pressed into the likewise heated bore. A disadvantage thereof is that the branch pipe is guided exclusively by the bore and, because of the heated soft plastic and the very short guide surface of the bore, the branch pipe may be welded on obliquely or not perpendicularly to the pipeline axis, as a result of which the weld seam also does not turn out uniformly all the way around.

For this purpose, DE 2119251 provides a device for connecting an outlet stub to a main line, in which the outlet stub to be welded on is guided by the device, and therefore the outlet pipe is welded on perpendicularly to the main line. A disadvantage in this connection is the bulky device and also that an individual mount has to be present for every diameter of the outlet stub to be welded on.

It is an aspect of the invention to propose an apparatus which ensures that a branch pipe is welded onto a pipeline or a pipe perpendicularly and that the same apparatus can be used for differently dimensioned branch pipes.

This aspect is achieved in that the fitting holder has different guide inside diameters which guide the differently dimensioned branch pipes by way of their differently dimensioned outside diameters in the fitting holder.

The fitting holder according to the preferred embodiment of the invention is designed for receiving a branch pipe during a welding operation. The branch pipe is arranged for attaching or welding onto a pipeline or a pipe in the fitting holder, wherein differently dimensioned branch pipes can be received by the fitting holder. The fitting holder is used as an installation aid and is removed from the welded-on branch pipe after the welding operation. The fitting holder comprises a hollow-cylindrical housing with an upper region which, during the installation or welding operation, faces away from the pipeline to be welded thereto. The fitting holder comprises a lower region which faces the pipeline to be welded thereto, wherein mounts for the axial fixing of the branch pipe which can be received by the fitting holder are arranged in the lower region. The mounts are arranged at the lower end of the housing. The branch pipe is fixed concentrically in the fitting holder for the Installation, wherein the fitting holder is pulled off from the branch pipe after the installation or welding is finished. The branch pipe is not part of the apparatus according to the invention, but rather serves only for better understanding of the function of the fitting holder. The fitting holder comprises a ring arranged displaceably in the housing, and clamping elements pressing the ring downwards. The ring is arranged in an axially displaceable manner in the housing. In addition, the ring is preferably not arranged rotatably in the housing.

The fitting holder has different guide inside diameters which guide the differently dimensioned branch pipes by way of their differently dimensioned outside diameters in the fitting holder.

An advantageous embodiment consists in that a guide inside diameter is arranged in the housing interior and a guide inside diameter is arranged on the displaceable ring. For example, the displaceable ring is located in a lower position in the housing, in which position the ring rests on a supporting surface and is pressed downwards by means of the clamping elements. By means of the guide inside diameter on the ring, which is located in the lower position, the introduced branch pipe or the outside diameter thereof is guided concentrically. It has proven advantageous if a branch pipe of larger dimensions with a larger outside diameter is introduced into the fitting holder, the ring is pressed upwards against the clamping elements since the branch pipe has a larger outside diameter than the guide inside diameter of the ring and therefore has to be pushed away so that the larger branch pipe can be received by the fitting holder at all. The larger branch pipe is then preferably guided by the guide inside diameter in the housing and lies concentrically against it. The guide inside diameter in the housing is preferably arranged in the lower region and is located below the displaceable ring.

Preferably, the mounts for the axial fixing of the branch pipe are designed as spring-loaded tabs along the circumference. It has been shown to be advantageous if between two and six tabs, especially preferably three or four tabs, are arranged regularly along the circumference of the housing. It is likewise advantageous if grooves for receiving the branch pipe are arranged on the inside diameter of the tabs. Surrounding the tabs by a protective sleeve has been shown to be a further advantageous embodiment.

Designing the clamping elements as compression spring elements has been shown to be a preferred embodiment. It is advantageous if between three to six compression springs guided in the housing are arranged regularly along the diameter. For example, a cylindrical pin, a screw or another cylindrical element which preferably runs in the interior of the compression spring can be used as the guide.

As a further advantageous embodiment, the fitting holder has a cover which makes it impossible for the ring to fall out of the housing. In addition, it is advantageous if a further guide inside diameter which concentrically guides the branch pipe is arranged in the cover. Such an embodiment is especially advantageous if the branch pipe is in the form of a long plastics pipe which protrudes through the fitting holder.

It has been shown to be advantageous if the housing, on the inside diameter, has a supporting surface onto which the ring is pressed by means of a clamping element. As already mentioned, the guide inside diameter of the ring, if it bears against the supporting surface, forms a guide for the corresponding branch pipe and can be displaced upwards for other dimensions of the branch pipe.

It has been shown to be advantageous if the housing of the fitting holder is made from plastic. The ring is preferably also made from plastic.

Preferably, the housing is in the form of a 3D printed part or injection-moulded part. This ensures a low weight and an optimized design.

It has also been shown to be advantageous if, in the upper region of the housing, the outer shaping is designed as an ergonomic shape and can easily be handled.

Preferably, the housing is formed integrally or as a single piece, that is to say that the housing does not require assembly.

It is advantageous if longitudinal guides are arranged in the housing. They can also be used for fastening the cover.

It has been shown to be advantageous if the ring has guide elements interacting with the longitudinal guides arranged in the housing. As a result, the ring cannot rotate in the housing, but rather is only displaceable axially.

All of the configuration options can be freely combined with one another.

BRIEF DESCRIPTION OF THE DRAWINGS

An exemplary embodiment of the invention will be described with reference to the figures, the invention not being limited to just the exemplary embodiment. In the figures.

DESCRIPTION OF THE PREFERRED
EMBODIMENTS OF THE INVENTION

Figures 1, 2:
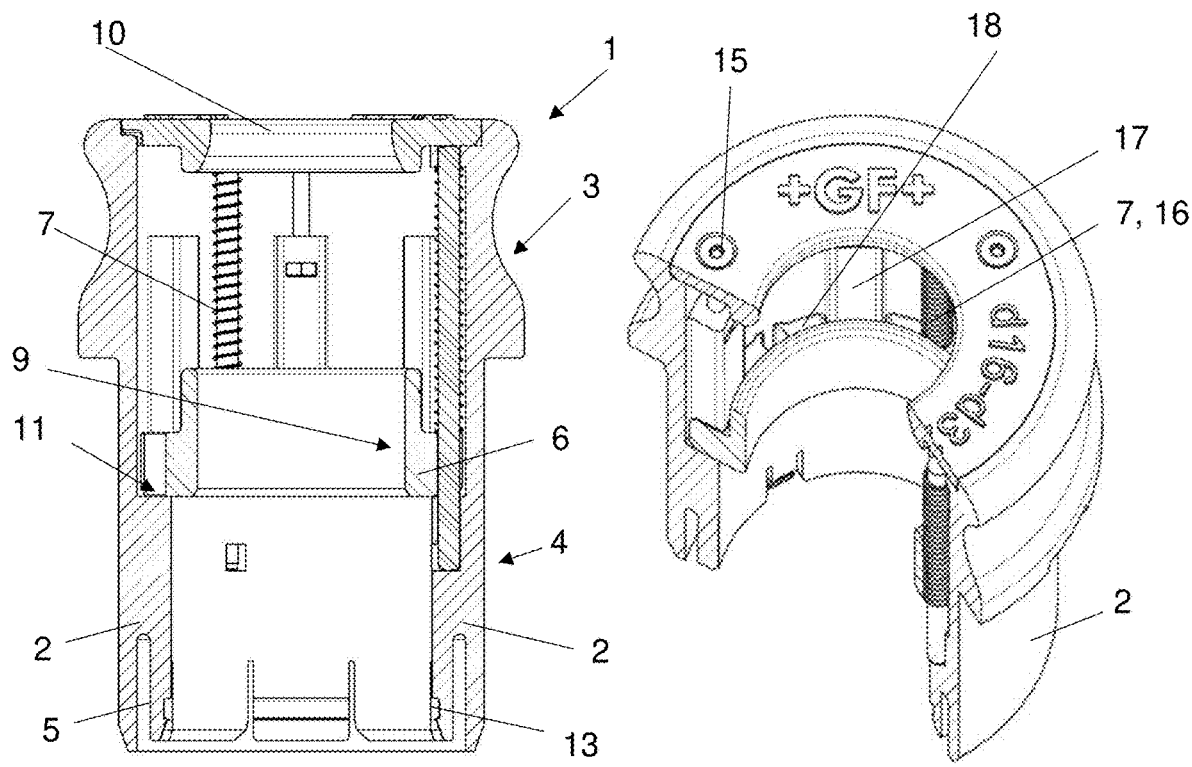
FIG. 1 shows a longitudinal section through a fitting holder according to the invention.
FIG. 2 shows a three-dimensional sectional view of the fitting holder according to the invention.
Figure 5:
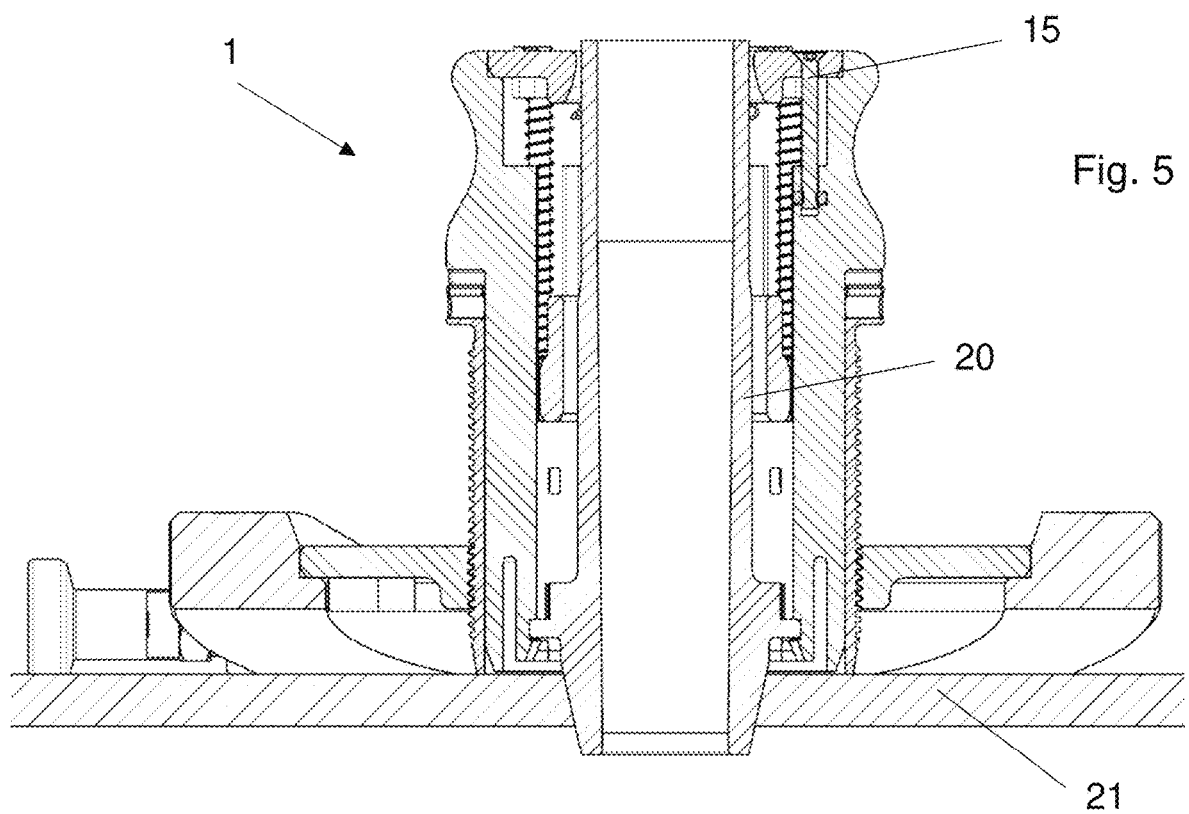
FIG. 5 shows a longitudinal section through a fitting holder according to the invention with an inserted branch pipe in a welding position in the pipeline.
Figure 6:
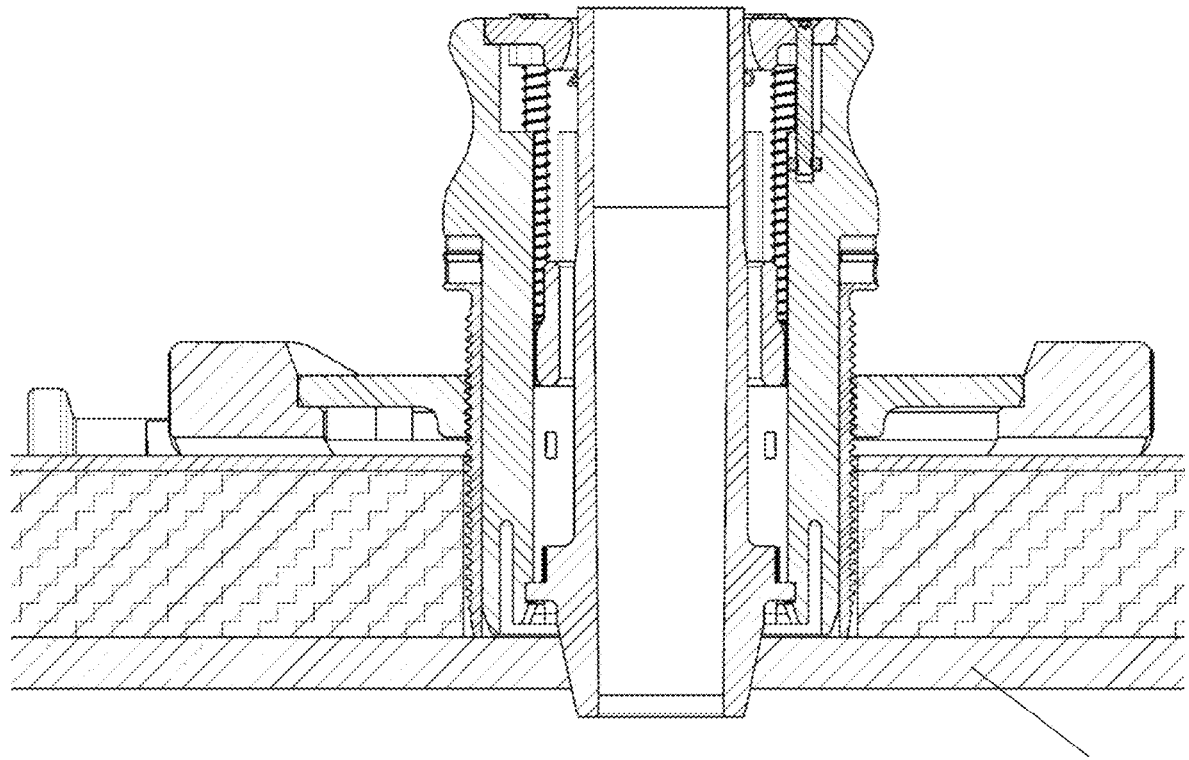
FIG. 6 shows a longitudinal section through a fitting holder according to the invention with an inserted branch pipe in a welding position in a pre-insulated pipeline.

The drawing illustrated in FIG. 1 shows a longitudinal section through a fitting holder 1 according to the invention. The fitting holder 1 is designed for receiving a branch pipe 20 which is welded onto a pipeline 21 or a pipe 21. In FIGS. 3 to 6, the branch pipe 20 which is received by the fitting holder 1 can be seen, with FIGS. 5 and 6 showing how the branch pipe 20 is welded to a pipe 21 or a pipeline 21 using the fitting holder 1. The fitting holder 1 is suitable for receiving differently dimensioned branch pipes 20 and also different embodiments of branch pipes 20. The fitting holder 1 has a housing 2 which is preferably made from plastic. The housing 2 has a hollow-cylindrical shape and is preferably formed integrally, as can readily be seen in FIGS. 1 to 6. The housing 2 has an upper and a lower region 3, 4. During the installation or the welding, the upper region faces away from the pipeline 21 and the lower region faces the pipeline 21.

Mounts 5 are arranged in the lower region or at the lower end of the housing 2, the mounts 5 preferably being designed as spring-loaded tabs 5. Grooves 13 for fixing the branch pipe 20 axially in the fitting holder 1 are arranged on the inner circumference of the tabs 5. The grooves 13 can readily be seen in FIGS. 1 and 2. The mounts 5, which are preferably designed as spring-loaded tabs 5, are preferably surrounded by a protective sleeve 12, wherein said protective sleeve 12 is likewise an integral part of the housing 2 and like the mounts 5 or tabs 5 belongs to the integral housing.

Figures 3, 4:
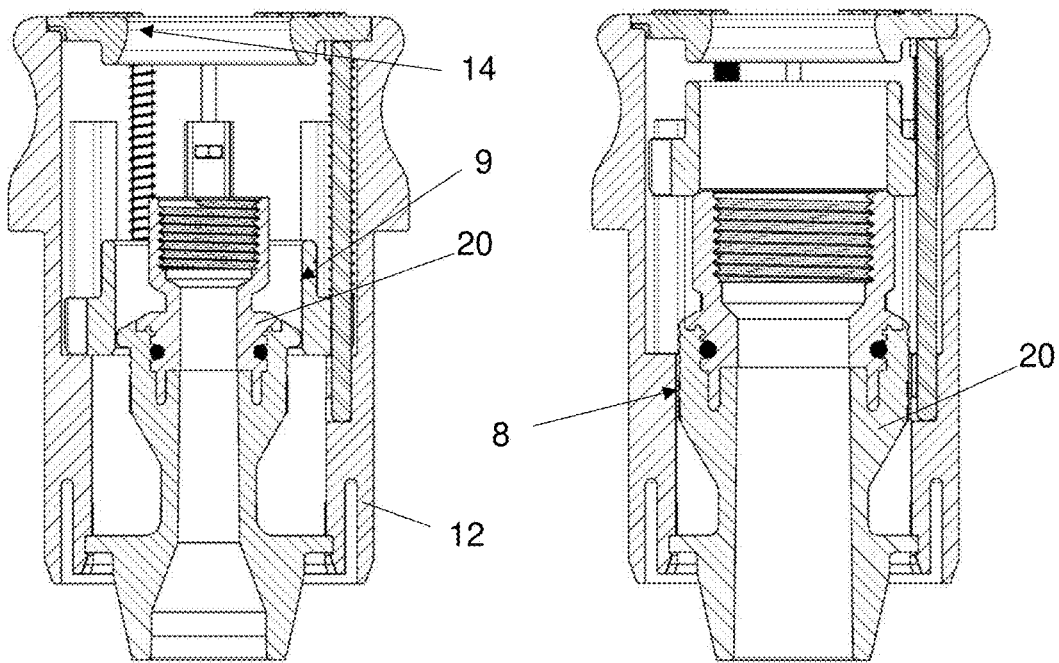
FIG. 3 shows a longitudinal section through a fitting holder according to the invention with an inserted branch pipe having a small outside diameter.
FIG. 4 shows a longitudinal section through a fitting holder according to the invention with an inserted branch pipe having a large outside diameter.

The fitting holder 1 includes a ring 6, the ring 6 being arranged axially displaceably in the housing 2. It can readily be seen in FIG. 1 that the ring 6 is pressed by clamping elements 7 against the supporting surface 11 in the housing interior. The clamping elements 7 are preferably designed as compression springs 7 and, in their interior, preferably have a guide 16, e.g. a cylindrical pin or a cylindrical fastening element. For receiving the different branch pipe dimensions, the fitting holder 1 has different guide inside diameters 8, 9, 14 which guide the branch pipes 20 by way of their outside diameters. It is advantageous if one of the guide inside diameters 8 is arranged in the housing 2 and the other on the ring 6. FIG. 3 shows the fitting holder 1 according to the invention with a smaller branch pipe 20. It can readily be seen that this branch pipe 20 is guided by the guide inside diameter 9 on the ring 6 and the ring 6 lies against the supporting surface 11 in the housing 2. FIG. 4 shows a larger embodiment of the branch pipe 20 which is received by the fitting holder 1. It can readily be seen that the ring 6 is pressed with the branch pipe 20 upwards against the clamping elements 7 so that the smaller guide inside diameter 9 in the ring 6 does not obstruct the receiving of the branch pipe 20 and therefore the branch pipe 20 is guided by the guide inside diameter 8 in the housing 2.

Preferably, the guide inside diameter 14 in the cover 10 serves as a further possibility for guiding a branch pipe 20, as can be seen in FIGS. 5 and 6. In addition, the cover 10 prevents the ring 6 from being able to fall out of the housing 2, e.g. in the event of an upside down installation. The cover 10 is fastened to the housing with fastening means 15. It can also be seen from FIGS. 5 and 6 that the fitting holder 1 can be used in the event of welding work on normal pipes as well as pre-insulated pipes. FIG. 2 shows the longitudinal guides 17 which are arranged in the housing interior and to which the guide elements 18 on the ring 6 correspond and the ring 6 is thereby displaceable exclusively axially. In addition, the fitting holder 1 preferably has an ergonomic design on the outside diameter in the upper region 3 for better handling.

What is claimed is:

1. A fitting holder (1) designed for receiving a branch pipe (20) during a welding operation in order to attach the branch pipe (20) to a pipeline (21) or a pipe (21), wherein differently dimensioned branch pipes (20) can be alternately received by the fitting holder (1), comprising a hollow-cylindrical housing (2) with an upper region (3) which, during the welding, faces away from the pipeline (21) to be welded thereto, and a lower region (4) which, during the welding, faces the pipeline (21) to be welded thereto, wherein mounts (5) for the axial fixing of the branch pipe (20) which can be received by the fitting holder (1) are arranged in the lower region (4), a ring (6) arranged displaceably in the housing (2), and at least one clamping element (7) pressing the ring (6) downwards, wherein the fitting holder (1) has a plurality of different guides of different inside diameters (8, 9, 14) which alternately guide the differently dimensioned branch pipes (20) by way of their differently dimensioned outside diameters in the fitting holder (1).

2. A fitting holder (1) according to claim 1, wherein one of the guides is arranged in the housing (2) and another guide is arranged in the displaceable ring (6).

3. A fitting holder (1) according to claim 1, wherein the mounts (5) for the axial fixing of the branch pipe (20) are designed as spring-loaded tabs (5).

4. A fitting holder (1) according to claim 1, wherein the at least one clamping element is are designed as a compression spring.

5. A fitting holder (1) according to claim 1, wherein the fitting holder (1) has a cover (10) which makes it impossible for the ring (6) to fall out of the housing (2).

6. A fitting holder (1) according to claim 5, wherein the cover has a guide for guiding a branch pipe (20).

7. A fitting holder (1) according to claim 1, wherein the housing (2) has a supporting surface (11) onto which the ring (6) is pressed by the at least one clamping element.

8. A fitting holder (1) according to claim 1, wherein the housing (2) of the fitting holder (1) is made from plastic.

9. A fitting holder (1) according to claim 1, wherein the housing (2) is in the form of a 3D printed part or injection-moulded part.

10. A fitting holder (1) according to claim 1, wherein the housing (2) is formed integrally.

11. A fitting holder (1) according to claim 1, wherein longitudinal guides (17) are arranged in the housing (2).

12. A fitting holder (1) according to claim 1, wherein the ring (6) has guide elements (18) interacting with longitudinal guides (17) arranged in the housing (2).

* * * * *